US007234029B2

(12) United States Patent
Khare et al.

(10) Patent No.: US 7,234,029 B2
(45) Date of Patent: Jun. 19, 2007

(54) METHOD AND APPARATUS FOR REDUCING MEMORY LATENCY IN A CACHE COHERENT MULTI-NODE ARCHITECTURE

(75) Inventors: Manoj Khare, Saratoga, CA (US); Faye A. Briggs, Portland, OR (US); Akhilesh Kumar, Sunnyvale, CA (US); Lily P. Looi, Portland, OR (US); Kai Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 595 days.

(21) Appl. No.: 09/749,660

(22) Filed: Dec. 28, 2000

(65) Prior Publication Data

US 2002/0087811 A1  Jul. 4, 2002

(51) Int. Cl.
*G06F 12/08* (2006.01)
*G06F 13/00* (2006.01)

(52) U.S. Cl. ............... 711/146; 711/100; 711/141; 711/146

(58) Field of Classification Search ........... 711/100, 711/118, 130, 141, 144, 146, 154
See application file for complete search history.

(56) References Cited

U.S. PATENT DOCUMENTS

| | | | |
|---|---|---|---|
| 5,485,579 A | 1/1996 | Hitz et al. ............. 395/200.12 |
| 5,495,419 A | 2/1996 | Rostoker et al. ............. 364/468 |
| 5,535,116 A | 7/1996 | Gupta et al. ................ 364/134 |
| 5,541,914 A | 7/1996 | Krishnamoorthy et al. ... 370/56 |
| 5,551,048 A | 8/1996 | Steely, Jr. .................... 395/800 |
| 5,557,533 A | 9/1996 | Koford et al. .............. 364/491 |
| 5,581,729 A | 12/1996 | Nishtala et al. ............. 395/470 |
| 5,588,131 A | 12/1996 | Borrill ........................ 395/473 |
| 5,588,132 A | 12/1996 | Cardoza ..................... 395/475 |
| 5,588,152 A | 12/1996 | Dapp et al. ................. 395/800 |
| 5,590,292 A | 12/1996 | Wooten et al. ............. 395/825 |
| 5,590,345 A | 12/1996 | Barker et al. ............... 395/800 |
| 5,594,918 A | 1/1997 | Knowles et al. ............ 395/800 |
| 5,603,005 A | 2/1997 | Bauman et al. ............. 395/451 |
| 5,613,136 A | 3/1997 | Casavant et al. ........... 395/800 |
| 5,617,537 A | 4/1997 | Yamada et al. ........ 395/200.01 |
| 5,625,836 A | 4/1997 | Barker et al. ............... 395/800 |
| 5,634,004 A | 5/1997 | Gopinath et al. ...... 395/200.02 |
| 5,634,068 A | 5/1997 | Nishtala et al. ............. 395/800 |
| 5,636,125 A | 6/1997 | Rostoker et al. ........ 365/468.28 |
| 5,644,753 A | 7/1997 | Ebrahim et al. ............ 395/458 |
| 5,655,100 A | 8/1997 | Ebrahim et al. ............ 395/471 |
| 5,657,472 A | 8/1997 | Van Loo et al. ............ 395/485 |
| 5,678,026 A | 10/1997 | Vartti et al. ................. 395/479 |
| 5,680,571 A | 10/1997 | Bauman ..................... 395/449 |
| 5,680,576 A | 10/1997 | Laudon ...................... 395/472 |
| 5,682,322 A | 10/1997 | Boyle et al. ................ 364/491 |
| 5,682,512 A | 10/1997 | Tetrick ....................... 395/412 |
| 5,684,977 A | 11/1997 | Van Loo et al. ............ 395/470 |

(Continued)

*Primary Examiner*—Tuan V. Thai
(74) *Attorney, Agent, or Firm*—Kenyon & Kenyon LLP

(57) ABSTRACT

A method for reducing memory latency in a multi-node architecture. In one embodiment, a speculative read request is issued to a home node before results of a cache coherence protocol are determined. The home node initiates a read to memory to complete the speculative read request. Results of a cache coherence protocol may be determined by a coherence agent to resolve cache coherency after the speculative read request is issued.

27 Claims, 5 Drawing Sheets

U.S. PATENT DOCUMENTS

| | | | |
|---|---|---|---|
| 5,699,500 A | 12/1997 | Dasgupta | 395/180 |
| 5,701,313 A | 12/1997 | Purdham | 371/40.2 |
| 5,701,413 A | 12/1997 | Zulian et al. | 395/200.02 |
| 5,708,836 A | 1/1998 | Wilkinson et al. | 395/800 |
| 5,710,935 A | 1/1998 | Barker et al. | 395/800 |
| 5,713,037 A | 1/1998 | Wilkinson et al. | 395/800 |
| 5,717,942 A | 2/1998 | Haupt et al. | 395/800 |
| 5,717,943 A | 2/1998 | Barker et al. | 395/800 |
| 5,717,944 A | 2/1998 | Wilkinson et al. | 395/800 |
| 5,734,921 A | 3/1998 | Dapp et al. | 395/800.1 |
| 5,734,922 A | 3/1998 | Hagersten et al. | 395/800.37 |
| 5,742,510 A | 4/1998 | Rostoker et al. | 364/468.03 |
| 5,745,363 A | 4/1998 | Rostoker et al. | 364/468.28 |
| 5,749,095 A | 5/1998 | Hagersten | 711/141 |
| 5,752,067 A | 5/1998 | Wilkinson et al. | 395/800.16 |
| 5,754,789 A | 5/1998 | Nowatzyk et al. | 395/200.63 |
| 5,754,871 A | 5/1998 | Wilkinson et al. | 395/800 |
| 5,754,877 A | 5/1998 | Hagersten et al. | 395/800.29 |
| 5,761,523 A | 6/1998 | Wilkinson et al. | 395/800.2 |
| 5,765,011 A | 6/1998 | Wilkinson et al. | 395/800.2 |
| 5,781,439 A | 7/1998 | Rostoker et al. | 364/468.28 |
| 5,784,697 A | 7/1998 | Funk et al. | 711/170 |
| 5,787,094 A | 7/1998 | Cecchi et al. | 371/53 |
| 5,793,644 A | 8/1998 | Koford et al. | 364/491 |
| 5,794,059 A | 8/1998 | Barker et al. | 395/800.1 |
| 5,796,605 A | 8/1998 | Hagersten | 365/134 |
| 5,802,578 A | 9/1998 | Lovett | 711/147 |
| 5,805,839 A | 9/1998 | Singhal | 395/292 |
| 5,815,403 A | 9/1998 | Jones et al. | 364/489 |
| 5,842,031 A | 11/1998 | Barker et al. | 395/800 |
| 5,848,254 A | 12/1998 | Hagersten | 395/383 |
| 5,857,113 A | 1/1999 | Muegge et al. | 395/830 |
| 5,860,159 A | 1/1999 | Hagersten | 711/151 |
| 5,862,316 A | 1/1999 | Hagersten et al. | 395/182.13 |
| 5,864,738 A | 1/1999 | Kessler et al. | 395/200.69 |
| 5,867,649 A | 2/1999 | Larson | 395/200.31 |
| 5,870,313 A | 2/1999 | Boyle et al. | 364/491 |
| 5,870,619 A | 2/1999 | Wilkinson et al. | 395/800.2 |
| 5,875,117 A | 2/1999 | Jones et al. | 364/491 |
| 5,875,201 A | 2/1999 | Bauman et al. | 371/49.1 |
| 5,875,462 A | 2/1999 | Bauman et al. | 711/119 |
| 5,875,472 A | 2/1999 | Bauman et al. | 711/150 |
| 5,878,241 A | 3/1999 | Wilkinson et al. | 395/379 |
| 5,878,268 A | 3/1999 | Hagersten | 395/800.28 |
| 5,881,303 A | 3/1999 | Hagersten et al. | 395/800.3 |
| 5,887,138 A | 3/1999 | Hagersten et al. | 395/200.45 |
| 5,887,146 A | 3/1999 | Baxter et al. | 395/284 |
| 5,892,970 A | 4/1999 | Hagersten | 395/825 |
| 5,895,484 A * | 4/1999 | Arimilli et al. | 711/118 |
| 5,897,657 A | 4/1999 | Hagersten et al. | 711/145 |
| 5,900,020 A | 5/1999 | Safranek et al. | 711/167 |
| 5,903,461 A | 5/1999 | Rostoker et al. | 364/468.28 |
| 5,905,881 A | 5/1999 | Tran et al. | 395/395 |
| 5,905,998 A | 5/1999 | Ebrahim et al. | 711/144 |
| 5,911,052 A | 6/1999 | Singhal et al. | 395/293 |
| 5,914,887 A | 6/1999 | Scepanovic et al. | 364/491 |
| 5,922,063 A | 7/1999 | Olnowich et al. | 710/132 |
| 5,925,097 A | 7/1999 | Gopinath et al. | 709/200 |
| 5,931,938 A | 8/1999 | Drogichen et al. | 712/15 |
| 5,938,765 A | 8/1999 | Dove et al. | 713/1 |
| 5,941,967 A | 8/1999 | Zulian | 710/107 |
| 5,943,150 A | 8/1999 | Deri et al. | 359/133 |
| 5,946,710 A | 8/1999 | Bauman et al. | 711/129 |
| 5,950,226 A | 9/1999 | Hagersten et al. | 711/124 |
| 5,958,019 A | 9/1999 | Hagersten et al. | 709/400 |
| 5,960,455 A | 9/1999 | Bauman | 711/120 |
| 5,961,623 A | 10/1999 | James et al. | 710/113 |
| 5,963,745 A | 10/1999 | Collins et al. | 395/800.13 |
| 5,963,746 A | 10/1999 | Barker et al. | 395/800.2 |
| 5,963,975 A | 10/1999 | Boyle et al. | 711/147 |
| 5,964,886 A | 10/1999 | Slaughter et al. | 714/4 |
| 5,966,528 A | 10/1999 | Wilkinson et al. | 395/563 |
| 5,971,923 A | 10/1999 | Finger | 600/437 |
| 5,978,578 A | 11/1999 | Azarya et al. | 395/701 |
| 5,978,874 A | 11/1999 | Singhal et al. | 710/107 |
| 5,983,326 A | 11/1999 | Hagersten et al. | 711/147 |
| 5,999,734 A | 12/1999 | Willis et al. | 395/706 |
| 6,026,461 A | 2/2000 | Baxter et al. | 710/244 |
| 6,038,646 A | 3/2000 | Sproull | 711/158 |
| 6,038,651 A | 3/2000 | VanHuben et al. | 712/21 |
| 6,041,376 A | 3/2000 | Gilbert et al. | 710/108 |
| 6,049,845 A | 4/2000 | Bauman et al. | 710/113 |
| 6,049,853 A | 4/2000 | Kingsbury et al. | 711/147 |
| 6,052,760 A | 4/2000 | Bauman et al. | 711/119 |
| 6,055,617 A | 4/2000 | Kingsbury | 711/203 |
| 6,065,037 A | 5/2000 | Hitz et al. | 709/200 |
| 6,065,077 A | 5/2000 | Fu | 710/100 |
| 6,081,844 A | 6/2000 | Nowatzyk et al. | 709/233 |
| 6,085,295 A | 7/2000 | Ekanadham et al. | 711/145 |
| 6,092,136 A | 7/2000 | Luedtke | 710/107 |
| 6,092,156 A | 7/2000 | Schibinger et al. | 711/145 |
| 6,094,715 A | 7/2000 | Wilkinson et al. | 712/20 |
| 6,108,739 A | 8/2000 | James et al. | 710/113 |
| 6,108,764 A * | 8/2000 | Baumgartner et al. | 712/28 |
| 6,119,215 A | 9/2000 | Key et al. | 712/19 |
| 6,141,733 A | 10/2000 | Arimilli et al. | 711/141 |
| 6,145,032 A * | 11/2000 | Bannister et al. | 710/52 |
| 6,148,361 A | 11/2000 | Carpenter et al. | 710/260 |
| 6,155,725 A | 12/2000 | Scepanovic et al. | 395/500.1 |
| 6,161,191 A | 12/2000 | Slaughter et al. | 714/4 |
| 6,167,489 A | 12/2000 | Bauman et al. | 711/145 |
| 6,171,244 B1 | 1/2001 | Finger et al. | 600/437 |
| 6,173,386 B1 | 1/2001 | Key et al. | 712/10 |
| 6,173,413 B1 | 1/2001 | Slaughter et al. | 714/6 |
| 6,182,112 B1 | 1/2001 | Malek et al. | 709/201 |
| 6,189,078 B1 | 2/2001 | Bauman et al. | 711/156 |
| 6,189,111 B1 | 2/2001 | Alexander et al. | 714/8 |
| 6,199,135 B1 | 3/2001 | Maahs et al. | 710/129 |
| 6,199,144 B1 | 3/2001 | Arora et al. | 711/145 |
| 6,205,528 B1 | 3/2001 | Kingsbury et al. | 711/170 |
| 6,209,064 B1 | 3/2001 | Weber | 711/141 |
| 6,212,610 B1 | 4/2001 | Weber et al. | 711/164 |
| 6,226,714 B1 | 5/2001 | Safranek et al. | 711/119 |
| 6,275,907 B1 * | 8/2001 | Baumgartner et al. | 711/143 |
| 6,338,122 B1 * | 1/2002 | Baumgartner et al. | 711/141 |
| 6,615,319 B2 * | 9/2003 | Khare et al. | 711/141 |
| 6,678,840 B1 * | 1/2004 | Kessler et al. | 714/51 |
| 6,681,293 B1 * | 1/2004 | Solomon et al. | 711/122 |
| 2002/0078315 A1 * | 6/2002 | Howard et al. | 711/162 |
| 2003/0105828 A1 * | 6/2003 | Sano et al. | 709/212 |

* cited by examiner

FIG. 3

Snoop Filter Table 143

| Memory Address | Node/Processor Identifier | Caching Status |
|---|---|---|
| 0 | Node X, Processor Y | I, E, or S |
| 10 | Node X, Processor Y | I, E, or S |
| 59 | Node X, Processor Y | I, E, or S |
| ... | ... | ... |
| N | Node X, Processor Y | I, E, or S |

METHOD AND APPARATUS FOR REDUCING MEMORY LATENCY IN A CACHE COHERENT MULTI-NODE ARCHITECTURE

FIELD OF THE INVENTION

Embodiments of the present invention relate to a computer system having multi-node distributed shared memory architecture. The present invention relates to a method and apparatus for managing memory related requests and in particular for reducing memory latency in a multi-node architecture.

BACKGROUND

Computer systems may contain multiple processors that may work together to perform a task. For example, a computer system may contain four processors that may share system resources (e.g., input devices or memory devices) and may perform parallel processing. The processors may send messages to each other, may send messages to system resources, and may send and receive messages from the system resources. For example, such messages may include requests for information that is stored at a location in a memory device or a request to store information in a location of a memory device.

In a cache coherent shared memory multiprocessor, the set of data currently being used by a microprocessor may be copied from a system memory device such as a dynamic random access memory (DRAM) into a relatively smaller but faster cache memory device such as a static random access memory (SRAM). In such systems, a cache is said to be "coherent" if the information resident in the cache accurately reflects the information in DRAM memory. Lack of cache coherency can occur when a requester for a memory location does not receive the latest copy of the data. For example, if the cache is updated while main memory is not and a new requester for this location receives the data from main memory into the requester's cache, the cache is said to be non-coherent.

Cache "snooping" is a technique used to detect an access to memory that might cause a cache coherency problem. For example, in the case where the cache is updated while the memory is not, the memory request from the new requesting agent is snooped in the cache containing updated data, which then supplies the data to the requester instead of memory. In a multi-processor system, the messages sent between processors may include cache snooping messages generated in accordance with a coherence protocol. A coherence protocol (e.g., MESI protocol) is implemented to prevent cache coherency problems.

Typically, in order for the requester to receive updated data, the result of the cache coherence protocol is first determined before the memory access is started. In a large scale multi-node distributed memory multi-processor, the resolution of the cache coherence protocol may take a long time, resulting in increased memory latency for accessing data from memory.

DESCRIPTION OF THE DRAWINGS

FIG. 3 is an exemplary snoop filter according to an embodiment of the present invention.

DETAILED DESCRIPTION

Embodiments of the present invention relate to methods and apparatus for reducing memory latency in a cache coherent multi-node architecture using speculative memory read commands.

In an embodiment of the invention, before the coherence protocol results are determined or completed, a requesting node or a coherence agent on behalf of the requesting node may issue a speculative memory read request to a home node of the requested memory location. The home node having the requested location may be defined as the node whose main memory stores the data for memory location (address) to be read. The home node that receives the speculative read request may access a memory address space to retrieve data specified by the speculative read request. While the home node of the memory location processes the speculative read request, the coherence agent determines the results of a cache coherence protocol. Based on these results, the coherence agent may send a cancel or confirm command to the home node. The cancel command causes the home node to drop the retrieved data, while the confirm command causes the home node to return the accessed data to the requesting agent.

The coherence protocol may require a snoop filter or directory look-up table located within the coherence agent, for example, to determine the location and status of the cached copies of the requested data. The snoop filter may determine whether the requested data is cached in an invalid, exclusive or shared state in one of the plurality of nodes. Based on the result of the coherence protocol, a "confirm" or "cancel" command may be issued to the home node. If a confirm command is issued, the home node of the memory location supplies the data to the coherence agent.

In alternative embodiments, the snoop filter may determine, as a result of plurality of requests and responses, that one of the other nodes in the multi-node system has a more current copy of the requested data and/or can deliver it faster. Accordingly, a cancel command may be issued to the home node to drop the data accessed from memory and a read request may be sent to the other node to retrieve the requested data. In this case, the home node terminates the processing of the speculative read request and continues to process other requests.

Embodiments of the present invention reduce memory latency in a multi-node architecture. The present invention uses speculative read requests before results of a cache coherence protocol are determined. Speculative memory access is designed to be independent of the cache coherence protocol. Speculative memory requests are confirmed or cancelled after the results of the coherence protocol are determined. In embodiments of the present invention, since speculative memory reads can occur parallel to the processing of the cache coherence protocol, memory latency is reduced.

Figure 1:
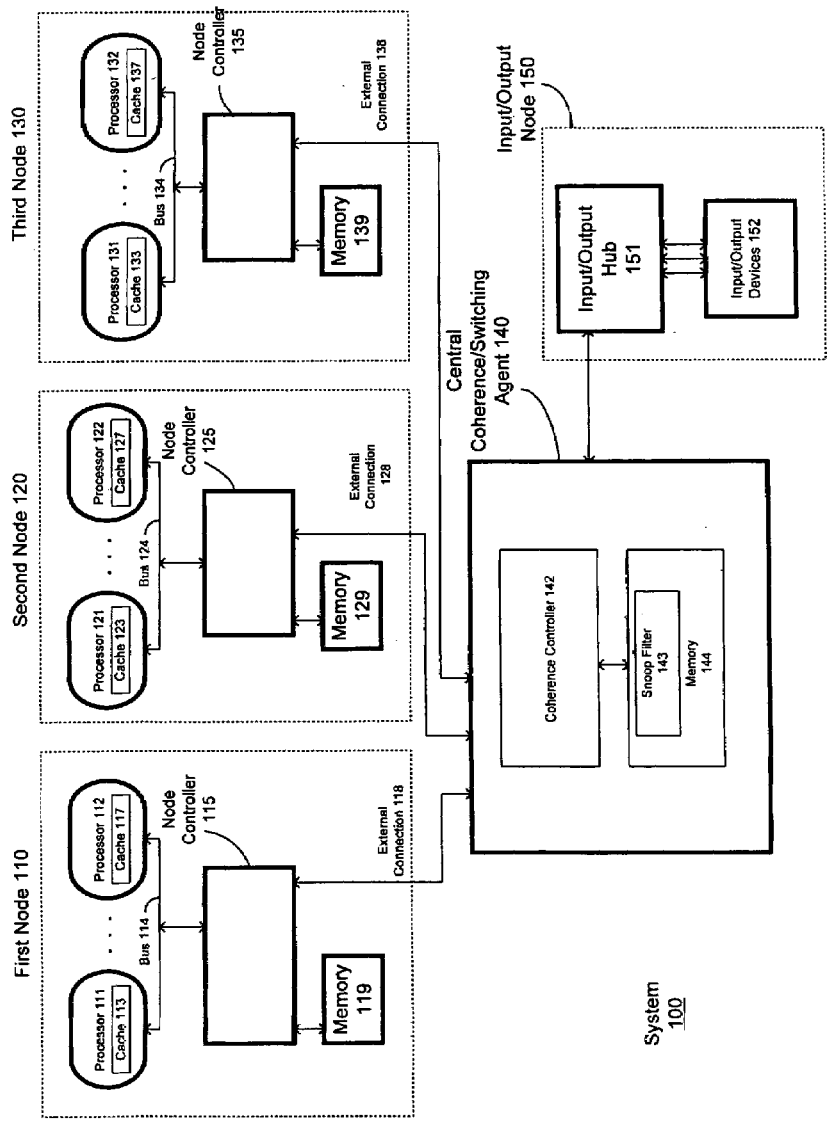
FIG. 1 is a partial block diagram of a system having a switching agent that manages memory requests according to an embodiment of the present invention.

FIG. 1 is a partial block diagram of a system having a central coherence/switching agent that manages memory requests according to an embodiment of the present invention. FIG. 1 shows a system 100 which is a computer system that includes processors, memory devices, and input/output devices. Components in system 100 are arranged into architectural units that are referred to herein as "nodes." A system that has multiple nodes may be referred to as a multi-node system.

Each node may contain one or more processors, memories, and/or input/output devices. The components within a node may be connected to other components in that node through one or more busses and/or lines. In addition, each node in system 100 has an external connector that may be used by the components within that node to communicate with components in other nodes. In one embodiment, any communication from a component within a first node to another node must be routed though the external connection for the first node. In system 100, the external connection for each node is connected to a central coherence/switching agent 140 (hereinafter referred to as coherence agent 140). In an alternative embodiment of the present invention, each of the nodes may communicate with other nodes through direct connections (not shown) that do not pass through coherence agent 140.

In embodiments of the present invention, the coherence agent 140 could be implemented in a central switch for all nodes (as shown in FIG. 1) or, alternatively, the coherence agent could be implemented in a distributed manner integrated in the node controllers of the node(s) (not shown).

The nodes in system 100 may send messages that are directed to a processor or resource in another node. For example, one node may send a request to read or write data to a memory location that is located in another node. Similarly, a node and/or coherence agent 140 may send a request to snoop the caches in the other nodes. In one embodiment, all requests in system 100 from one node to another node may be sent to coherence agent 140, and coherence agent 140 may send requests to other nodes that are based on the first request. For example, coherence agent 140 may receive a request from a first node to read or write data to a particular memory location, and coherence agent 140 may send snoop requests to the other nodes in system 100 as needed to carry out the received request from the first node. Alternatively, a node may send requests to another node without sending the same request to the coherence agent 140.

The details shown in FIG. 1 will now be discussed. As shown in FIG. 1, system 100 includes, for example, first node 110, second node 120, third node 130, and input/output node 150. Each of these nodes is coupled to coherence agent 140. The term "coupled" encompasses a direct connection, an indirect connection, an indirect communication, etc. First node 110 is coupled to coherence agent 140 through external connection 118, second node 120 is coupled to coherence agent 140 through external connection 128, and third-node 130 is coupled to coherence agent 140 through external connection 138. External connections 118, 128, and 138 may be one or more lines capable of communicating information to and from the node. In embodiments of the invention, the nodes may be coupled to each other through direct connections (not shown).

First node 110 includes processor 111, processor 112, and node controller 115, which are coupled to each other by bus 114. Processor 111 and processor 112 may be any microprocessors that are capable of processing instructions, such as for example a processor in the INTEL PENTIUM family of processors. Bus 114 may be a shared bus. First node 110 also contains a memory 119 which is coupled to node controller 115. Memory 119 may be a Random Access Memory (RAM). Processor 111 may contain a cache 113, and processor 112 may contain a cache 117. Cache 113 and cache 117 may be Level 2 (L2) cache memories that are comprised of SRAM. Of course, first node 110 may include processors additional to the ones shown (e.g., 111, 112).

Similarly, second node 120 contains processors 121, 122 and node controller 125 that are coupled to each other by bus 124. Second node 120 also contains a memory 129 that is coupled to node controller 125. Third node 130 contains processors 131,132, and node controller 135 that are coupled to each other by bus 134. Third node 130 also contains a memory 139 that is coupled to node controller 135. Processors 121, 122 may contain cache 123, 127, respectively. Processors 131, 132 may contain cache 133, 137 respectively. Processors 121, 122, 131, and 132 may be similar to processors 111 and 112. In an embodiment, two or more of processors 111, 112, 121, 122, 131, and 132 are capable of processing a program in parallel. System 100 may include additional nodes, and each of the nodes (e.g., 110, 120, 130, etc.) may include processors additional to the ones shown (e.g., 111, 112, 121, 122, 131, 132). Node controllers 125 and 135 may be similar to node controller 115, and memory 129 and 139 may be similar to memory 119.

In an embodiment of the present invention, coherence agent 140 may be a routing switch for managing speculative reads and/or writes and for routing messages within system 100. As shown in FIG. 1, coherence agent 140 contains a coherence controller 142 and a snoop filter or directory look up table 143 that may be stored in memory 144. The snoop filter 143 may include a plurality of memory addresses as well as corresponding memory status indicators. The memory status indicators may indicate the status of data located in the plurality of corresponding memory addresses.

The coherence controller 142 may monitor reads and writes to memory locations (e.g., in cache and main memory) that may occur in system 100 and may update the snoop filter 143 as necessary. The coherence controller 142 may perform speculative reads to cache and/or main memory to reduce latency in a cache coherent multi-node architecture in accordance with embodiments of the present invention.

As shown in FIG. 1, input/output node 150 contains an input/output hub 151 that is coupled to one or more input/output devices 152. Input/output devices 152 may be, for example, any combination of one or more of a printer, keyboard, mouse, or any other input/output device. Input/output hub 151 may by an integrated circuit that contains bus interface logic for interfacing with a bus that complies to, for example, the Peripheral Component Interconnect (PCI) standard. PCI Special Interest Group (SIG) PCI Local Bus Specification, Revision 2.2, published Dec. 18, 1998. Input/output hub 150 may be similar to, for example, the INTEL 82801AA I/O Controller Hub.

In an embodiment, node controller 115, coherence agent 140, and input/output hub 151 may be a chipset that provides the core functionality of a motherboard, such as a modified version of a chipset in the INTEL 815 family of chipsets.

In a further embodiment, inter-node communication in system 100 may be asynchronous (i.e., there is no fixed timing between events). In a still further embodiment, inter-node communication may be sent in the form of packets which may contain a header or a header and data sections. An example of a message size may be 144 bits. In an embodiment, the messages sent may include requests and responses. In a further embodiment, the types of requests that the nodes may send and receive may include a memory read request, memory write request, cache snoop request, cache flush request, memory update request, cache line replacement request, input/output port read request, and input/output port write request. Requests may contain fields such as a packet type, destination ID, request type, source ID, transaction address, request length, stream ID, and ordering semantics.

In an embodiment of the present invention, the processors in nodes 110, 120 and 130 may be shared memory multiprocessors and each of the memories 119, 129 and 139 may be part of the same shared physical address space. In a further embodiment, the processors in nodes 110, 120, and 130 communicate with each other through shared memory reads and writes (i.e., by writing to and reading from memory 119, 129 and 139). In a further embodiment, the processors in nodes 110, 120 and 130 each have one or more caches (e.g., Level 1 and Level 2 caches) and these caches are kept coherent using coherence agent 140. For example, when processor 111 accesses a location in memory 119, it may send a snoop request for that memory location to coherence agent 140, which may determine if any of the processors in second node 120 and third node 130 have cached that memory location. A snoop request may be generated when a processor needs other processors in the system to look in their own caches to see if a particular line is present in their cache.

Figure 2:
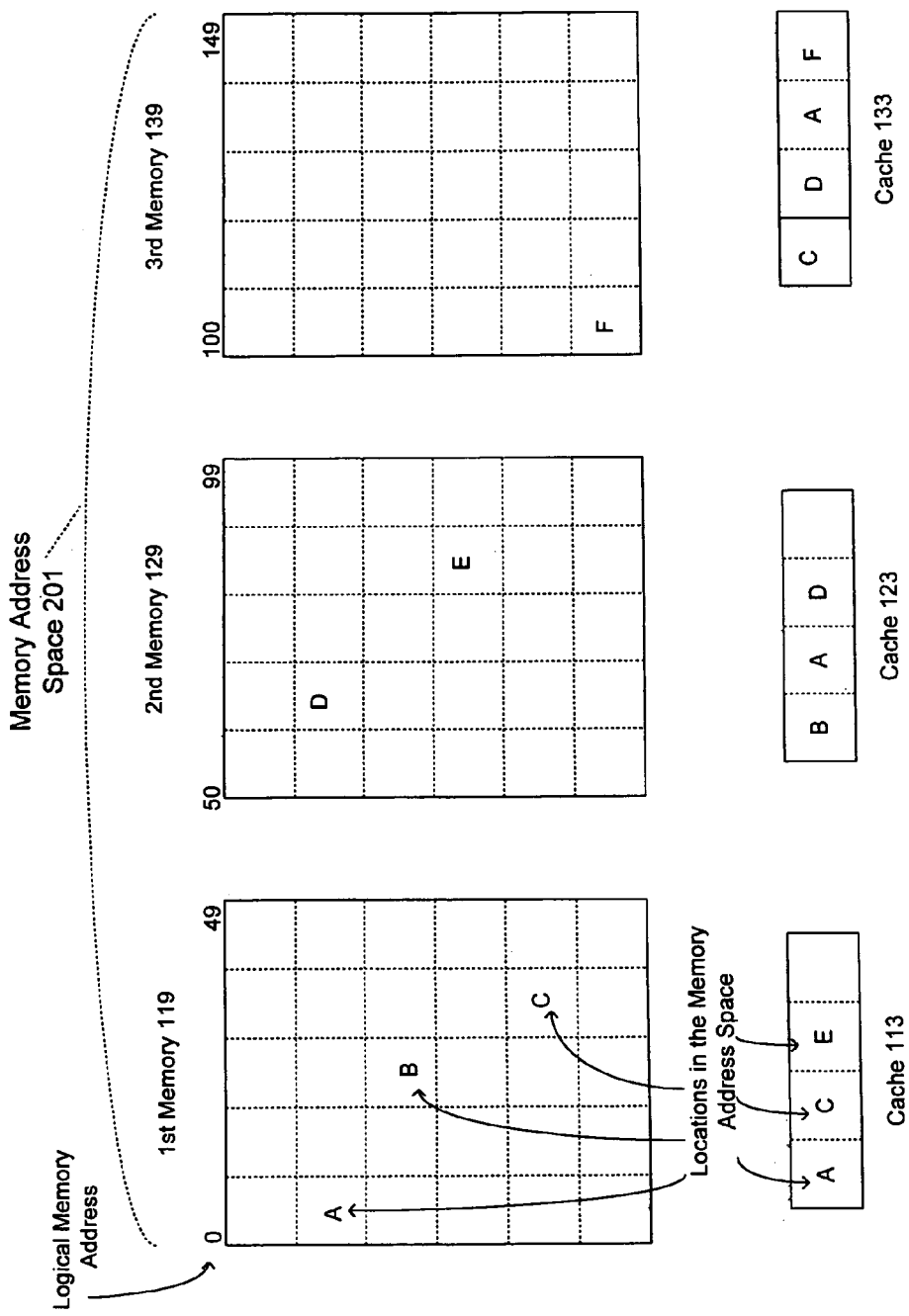
FIG. 2 is a partial block diagram showing a memory address space for a MULTI-NODE system according to an embodiment of the present invention.

FIG. 2 is a partial block diagram showing a memory address space 201 and caches for a multi-node system according to an embodiment of the present invention. Memory address space 201 includes first memory 119, second memory 129, and third memory 139, which are shown respectively in first node 110, second node 120, and third node 130 in FIG. 1. For the purpose of illustration, first memory 119 is shown as containing the addresses 0 to 49, second memory 129 is shown as containing the addresses 50 to 99, and third memory 139 is shown as containing the addresses 100 to 149. Thus, in this embodiment, address space 201 contains the locations in addresses 0 to 149. Of course, in other embodiments address space 201 may contain other addresses and address space 201 may be spread across more or less memories than as shown in FIG. 2. Address space 201 may be referred to as a "shared" address space because any node in the multi-node system may address any location in address space 201. Thus, second node 120 may send a request to read from location 0 in the address space, location 0 being contained in memory 119 in first node 110.

FIG. 2 also shows caches 113, 123, and 133, which are contained in first node 110, second node 120, and third node 130 of FIG. 1. The multi-node system may contain more or less caches than is shown in FIG. 2 (such as caches 117, 127 and 137 of FIG. 1). In an embodiment, each addressable location of memory in address space 201 may be the size of a cache line in caches 113, 123, and 133. In FIG. 2, certain locations in the memory address space 201 are designated as A, B, C, D, E and F for the purposes of reference. Each of these locations stores some information (data or instructions). The information in any particular location in the memory address space 201 may be cached in one or more of the caches in the system. Thus, a copy of the information in the location designated A in first memory 119 is cached in caches 113, 123, and 133; a copy of the information in the location designated B in first memory 119 is cached in cache 123; a copy of the information in the location designated C in first memory 119 is cached in caches 113 and 133; a copy of the information in the location designated D in second memory 129 is cached in cache 123 and cache 133; a copy of the information in the location designated E in second memory 129 is cached in cache 113; and a copy of the information in the location designated F in third memory 139 is cached in cache 133.

Coherence agent 140 may process requests as follows. If coherence agent 140 receives from first node 110 a request to access the memory location designated as D (in FIG. 2), the coherence controller 142 may determine from snoop filter 143 that memory location D is cached in both cache 123 (in second node 120) and cache 133 (in third node 130). Cache coherence controller 142 may then cause snoop requests that are associated with location D to be sent to second node 120 and third node 130 to access the memory location designated as D.

FIG. 3 is an illustration of an exemplary snoop filter or directory look-up table 143 in accordance with embodiments of the invention. Snoop filter 143 may be stored in memory 144 and may include information that may be regularly accessed and updated by the coherence controller 142. Snoop filter 143 may include rows and columns for storing, for example, memory address locations 301, an identifier for the node and corresponding processor where the data is located 303 and caching or snoop status 304. Unless otherwise specified, memory as referred to herein may refer to cache or main memory. Memory location 301 may contain memory addresses of a plurality of memory locations 0 through N that may be "snooped" by the coherence controller 142 (e.g., 0 through 149 discussed above). The column for node/processor identifier 303 may contain the identity of the node and corresponding processors that have data stored in memory (where X is, for example, any node in system 100 and Y is any processor in that node having the corresponding data).

The column for memory status 304 indicates the status of the corresponding data stored in the memory as specified by memory address 301. The memory status may indicate whether, for example, the stored data is in an invalid state (I), exclusive state (E) or shared state (S). An invalid state indicates that none of the nodes in the system 100 have the memory location identified by the memory address cached (i.e., a copy of the data stored in a cache). An exclusive state indicates the memory location identified by the memory address may be cached exclusively in only one node in the system. It is possible that the node with the exclusive copy of the data may have modified the data without informing the coherence controller 142. If the data has been modified, the data is considered to be "dirty" (i.e., in a modified state). The shared state indicates that one or more nodes in the system may have cached the data in a "clean" state (i.e., unmodified state).

The snoop filter 143 may be stored in an internal memory within the coherence agent 140 or in an external memory 144. The coherence controller 142 may read and write to snoop filter 143 when, for example, snooping one of the nodes in system 100 or performing other read and write requests.

Figure 4:
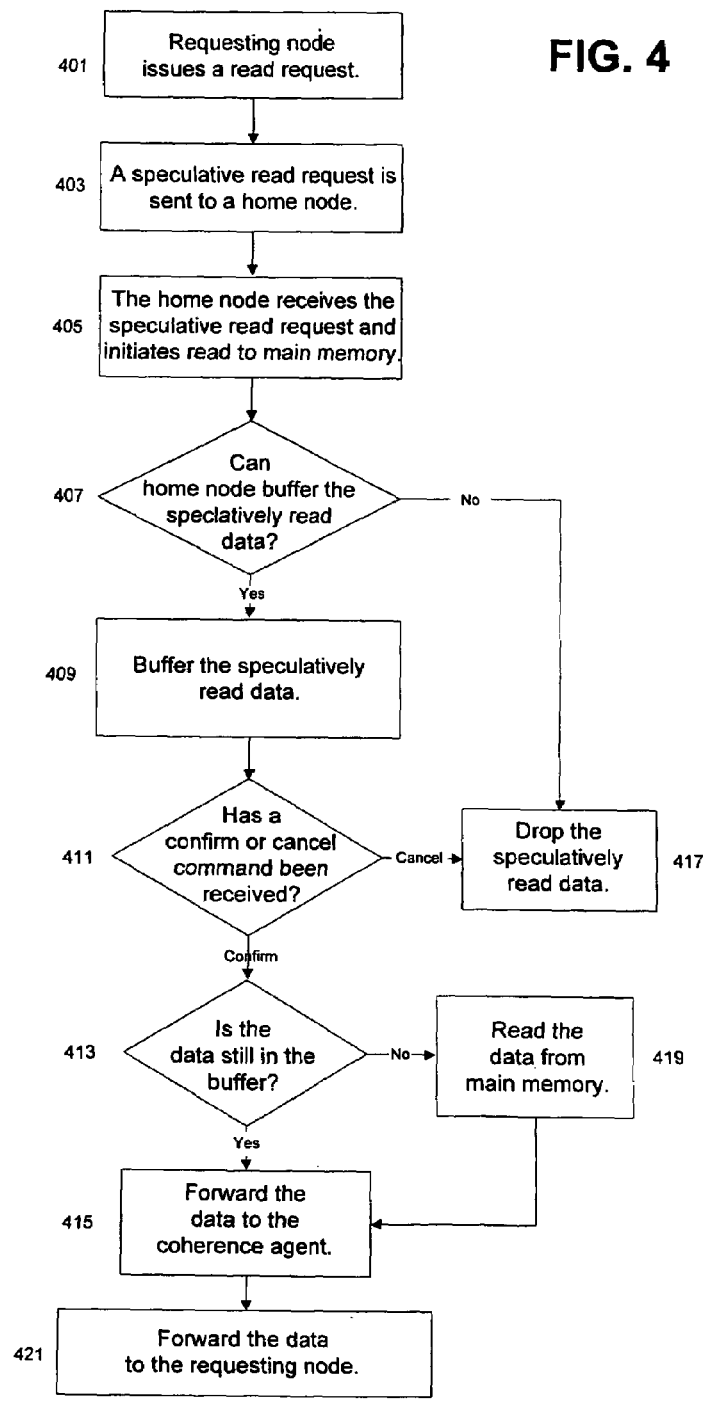
FIG. 4 is a flow diagram of a method for reducing memory latency in accordance with embodiments of the present invention.
Figure 5:
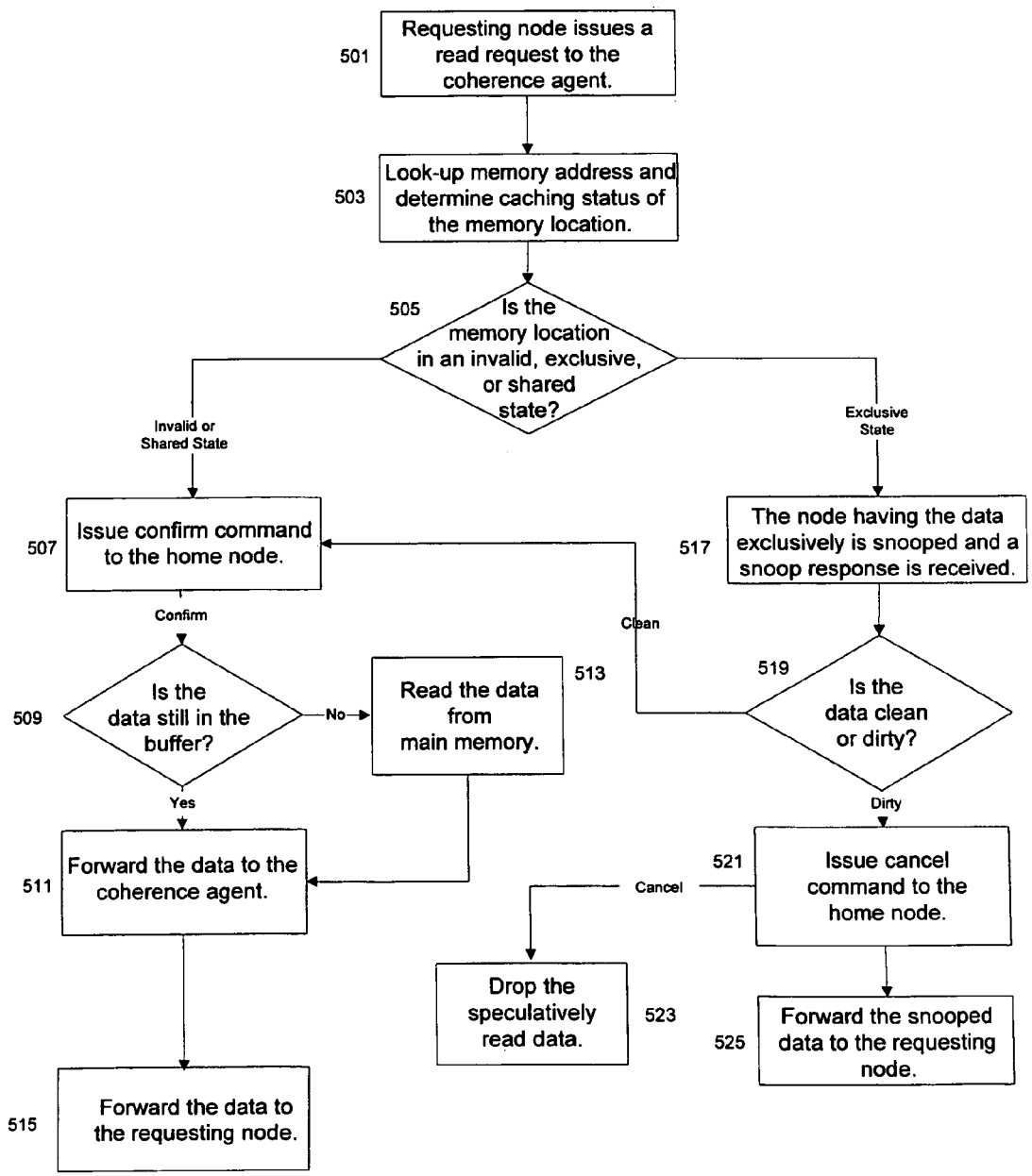
FIG. 5 is a flow diagram of a method for reducing memory latency in accordance with embodiments of the present invention.

FIGS. 4 and 5 are flow diagrams relating to a method for reducing memory latency in a cache coherent multi-node architecture using speculative memory read commands, according to embodiments of the present invention.

Referring to FIG. 4, a requesting node, for example, first node 110 may issue a read request to request data form another node (401). The read request includes the memory address of the memory location to be read. A requesting node may be any of the plurality of nodes of system 100. In an embodiment of the invention, the requesting node sends the read request to a coherence agent, for example, agent 140. Upon receiving the read request, coherence agent 140 may immediately issue a speculative read request to a home-node (403). The speculative read request is issued before coherence protocol results are determined or retrieved. The home node is identified as the node that contains the memory address of the memory location to be read (i.e., the "home" of the data to be read).

In alternative embodiments of the invention, the requesting node may directly issue the speculative read request including a memory address to the home node. If the requesting node issues the speculative read request directly, the requesting node also sends a read request to the coherence agent. The read request may be sent simultaneous with or soon after the speculative read request. The term requester as used herein may refer to either a requesting node or a coherence agent.

After the home node receives the speculative read request from either the requesting node or the coherence agent, the home node initiates a read to main memory (405). The speculative read request is received before coherence protocol results are received. Thus, for example, if node 130 shown in FIG. 1 is the home node, home node 130 initiates a read to main memory 139. Node controller 135, of the home node 130, accesses the memory location specified by the speculative read request. The node controller determines whether the speculatively read data can be buffered by the home node (407). The node controller determines whether buffering the speculatively read data will cause a buffer full condition that will prevent it from supporting, for example, non-speculative memory requests. If a buffer full condition occurs, data that has been speculatively read may be dropped. Speculative data that has been buffered for a longer period of time may be dropped first. If the speculatively read data can be buffered, the home node buffers the data (409). If the speculatively read data can not be buffered, the speculatively read data is dropped (417).

After the speculatively read data is buffered, the node controller of the home node awaits a confirm or cancel command relating to the speculatively read data. The confirm or cancel command is sent by a coherence controller of a coherence agent after results of a cache coherence protocol are determined (to be described below in more detail). If a cancel command is received, the speculatively read data is dropped (411 and 417). If a confirm command is received and the speculatively read data still exists in the buffer, the data is forwarded to the coherence agent (411, 413 and 415).

If a confirm command is received and the data no longer exists in the buffer, the node controller may read the requested data specified from main memory (411, 413 and 419). In embodiments of the invention, if the data is read from main memory, the data is buffered before it is forwarded to the coherence agent. After the data is read, the data is forwarded to the coherence agent (415).

After the coherence agent receives the data, the coherence agent forwards the data to the requesting node, for example, node 110 (421). In alternative embodiments, the home node may forward the data directly to the requesting node.

In embodiments of the invention, the cancel and confirm commands as well as the read and speculative read requests are issued with the full address of the requester and the transaction ID of the transaction issued by the requester to uniquely identify the command and/or request.

Referring to FIG. 5, after the requesting node issues a read request to the coherence agent, the coherence agent, for example, coherence agent 140 initiates a cache coherence resolution procedure in accordance with embodiments of the present invention (501). As described above, if the requesting node has not issued the speculative read request directly to the home node, the coherence agent issues the speculative read request to the home node. The speculative read request may be issued at or about the same time as the initiation of the coherence resolution protocol, but before the results of the cache coherent protocol are determined. The read request and the speculative read request includes the memory address of the memory location to be read.

According to embodiments of the present invention, the cache coherence resolution procedure maybe initiated by coherence controller 142. The coherence controller 142 looks-up the memory address in the snoop filter table 143 and determines the caching status of the memory location (503). If the memory location is determined to be in an invalid or shared state, the coherence controller issues a confirm command to the home node (505 and 507). The coherence controller updates the snoop filter with the updated caching status. The confirm command is issued with the full address of the memory location of the requested data. After receiving the confirm command, the node controller of the home node determines whether the data still exists in a buffer (509). If so, the data is forwarded to the coherence agent (511). If the data is no longer in the buffer, the data is read from the main memory and forwarded to the coherence agent (513 and 511). The coherence agent forwards the requested data to the requesting node, for example, node 110 (515).

If in step 505, the memory location looked up by the coherence controller is determined to be in an exclusive state, the coherence controller snoops the node having an exclusive copy of the desired data cached (517). A snoop response is received that includes the status of the data as well as a copy of the snooped data if the data is modified (i.e., dirty). After the coherence controller receives the snoop response, the controller determines whether the corresponding data is "clean" or "dirty" (519). As indicated above, the "clean" state indicates that the data has not been modified while the "dirty" state indicates that the data has been modified. If the data is clean, then a confirm command is issued to the home node (507). The coherence controller updates the snoop filter with the updated caching status. The home node then retrieves the data and forwards the data to the coherence agent (509513). The coherence agent forwards the requested data to the requesting node (515).

If the data is "dirty," the coherence agent may issue a cancel command to the home node (521). The coherence controller updates the snoop filter with the updated caching status. The cancel command is issued with the full address of the memory location of the requested data. In response to the cancel command, the home node drops the speculatively read data (523). In embodiments of the present invention a cancel command to the home node may not be required since the speculatively read data will be automatically dropped when the buffer can no longer keep the data (e.g., on a buffer full condition). In further alternative embodiments, the coherence agent may issue a write request to the home node. The write request may be issued if the requested memory location is found to be in, for example, a modified state in another node and the modified data may be reflected back to the home node. Thus, in this case the write request to update the home node could act as the cancel command that causes the speculatively read data to be dropped.

After or about the same time the cancel command to the home node is issued, the coherence controller forwards the snooped data to the requesting node (525). In an alternative embodiment, the node having the "dirty" or modified data may forward the data directly to the requesting node.

Embodiments of the invention may reduce memory latency in a multi-node architecture. The present invention uses speculative read requests before results of a cache coherence protocol are known. Speculative memory access is independent of the cache coherence protocol. Speculative memory requests are confirmed or cancelled after the results of the coherence protocol are determined. Embodiments of the invention, may reduce memory latency since speculative memory reads can occur while of the cache coherence protocol is being processed.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, while the nodes in FIG. 1 are shown containing one or two processors, a node may contain any number of processors. In one embodiment, a node contains only one processor and in another embodiment a node contains sixteen processors. As another example, while the nodes in FIG. 1 are connected through coherence agent 140, in another embodiment two nodes may be directly connected to each other. For example, in a system with that has two nodes, the node controller of a first node may be connected to the node controller of a second node.

In another embodiment, the node controller for a node may be part of a processor in that node. For example, a first node in a system may only contain one processor and the node controller for that node may be part of that processor. In another embodiment, the coherence agent and the associated coherence controller and snoop filter or directory, may be distributed. The distributed switch might in turn be integrated as part of the node controller. In addition, a node (e.g., node 110) may contain one or more processors and an input/output hub. In still another embodiment, the snoop filter, read/write requests and/or other commands are implemented as instructions adapted to be executed by a processor, which may include firmware, microcode, object code, source code, etc.

In yet another embodiment, the home node may be, for example, a central data repository that only has a memory controller. In this case, the home node stores data in memory and responds to snoop or read requests from other nodes.

What is claimed:

1. A method for reducing memory latency in a multi-node architecture, comprising:
   issuing a memory read request from a requesting node;
   issuing a speculative memory read request from a coherence agent in response to said memory read request from the requesting node;
   receiving the speculative memory read request at a home node before results of a cache coherence protocol are determined; and
   initiating a read to memory at the home node to complete the speculative memory read request before results of the cache coherence protocol are received by the home node.

2. The method of claim 1, further comprising:
   buffering results of the read to memory.

3. The method of claim 2, further comprising:
   dropping the results of the read to memory on a buffer full condition or if a cancel command is received.

4. The method of claim 3, further comprising:
   if a confirm command is received after results of the read to memory are dropped, initiating a second read to memory to complete a memory read request.

5. The method of claim 4, further comprising:
   forwarding results of the second read to memory to a requester.

6. The method of claim 3, further comprising:
   if a confirm command is received before results of the speculative read are dropped, forwarding the results of the read to memory to a requester.

7. The method of claim 6, further comprising:
   receiving the results of the read to memory at the coherence agent; and
   forwarding the results of the read to memory to the requesting node.

8. A method for reducing memory latency, comprising:
   issuing a memory read request by a requesting node;
   issuing a speculative memory read request from a coherence agent to a home node in response to said memory read request from the requesting node before results of a cache coherence protocol are determined;
   initiating a read to memory at said home node; and
   initiating the cache coherence protocol after initiating the read to memory at said home node.

9. The method of claim 8, further comprising:
   updating a memory status relating to the results in a table after the results of the cache coherence protocol are determined.

10. The method of claim 8, wherein initiating the cache coherence protocol comprising:
    initiating a status look-up to determine the caching status of the requested memory.

11. The method of claim 10, further comprising:
    issuing a confirm command to the home node if the caching status is determined to be in an invalid state or shared state.

12. The method of claim 10, further comprising:
    snooping a node with an exclusive copy of the requested memory cached.

13. The method of claim 12, further comprising:
    determining whether the exclusive copy of the requested memory is clean or dirty.

14. The method of claim 13, further comprising:
    issuing a confirm command to the home node if the exclusive copy of the requested memory is clean.

15. The method of claim 13, further comprising:
    issuing a cancel command to the home node if the exclusive copy of the requested memory is dirty.

16. The method of claim 12, further comprising:
    receiving a snoop result, wherein the snoop result includes a copy of the requested memory; and
    updating a memory status relating to the requested memory in a table.

17. The method of claim 16, further comprising:
    receiving the requested memory; and
    forwarding the requested memory to a requesting node.

18. A home node to respond to read requests in a multi-node architecture including a plurality of nodes, the home node comprising:
    a processor;
    a memory; and
    a node controller coupled to the processor and memory, the node controller to:
      receive a speculative memory read request from a coherency agent in the multi-node architecture before a cache coherence protocol is resolved, and
      initiate a read to memory at the home node to complete the speculative memory read request before the cache coherence protocol is resolved.

19. The home node of claim 18 further comprising:
a buffer adapted to buffer the results of the read to memory.

20. The home node of claim 19, wherein the results of the read from memory are dropped from the buffer on a buffer full condition or upon receiving a cancel command.

21. The home node of claim 19, wherein the node controller responsive to a confirm is adapted to forward the results of the read to memory to the requester.

22. The home node of claim 19, wherein the node controller responsive to a cancel command is adapted to drop the data specified by the speculative read command.

23. A system comprising:
a node including a node controller to control a plurality of processors resident in the node, wherein the node controller is to receive a speculative read request from a coherence agent before results of a coherence protocol are determined and the node controller is to read data specified by the speculative read command from memory before the results of the coherence protocol are received by the node; and the coherence agent coupled to the at least one node, the coherence agent including a coherence controller adapted to determine the results of the coherence protocol and adapted to forward a cancel command or a confirm command to the node after the results of the coherence protocol are determined.

24. The system of claim 23, wherein the node controller responsive to the confirm command issued by the coherence controller is adapted to send the data read from memory to the coherence controller.

25. The system of claim 23, wherein the node controller responsive to the cancel command issued by the coherence controller is adapted to drop the data read from memory.

26. The system of claim 23, further comprising:
a requesting node adapted to send a data read request to request data identified by a memory address included in the data read request.

27. The system of claim 23, wherein the speculative read request is sent by the coherence agent.

* * * * *